US012003916B1

(12) United States Patent
Shaffer et al.

(10) Patent No.: US 12,003,916 B1
(45) Date of Patent: Jun. 4, 2024

(54) ELECTRONIC DEVICES WITH SOUND PERMEABLE FABRIC

(71) Applicant: Apple Inc., Cupertino, CA (US)

(72) Inventors: Benjamin A. Shaffer, San Jose, CA (US); Yohji Hamada, Wakayama (JP); Vincenzo Vuono, Palermo (IT); Eugene A. Whang, San Francisco, CA (US); Christopher I. Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 487 days.

(21) Appl. No.: 17/211,607

(22) Filed: Mar. 24, 2021

Related U.S. Application Data

(60) Provisional application No. 63/002,233, filed on Mar. 30, 2020.

(51) Int. Cl.

| | |
|---|---|
| ***H04R 1/10*** | (2006.01) |
| ***D04B 21/14*** | (2006.01) |
| ***H04R 1/00*** | (2006.01) |
| ***H04R 1/02*** | (2006.01) |

(52) U.S. Cl.
CPC .......... *H04R 1/1091* (2013.01); *D04B 21/14* (2013.01); *H04R 1/023* (2013.01); *D10B 2503/00* (2013.01)

(58) Field of Classification Search
CPC .......... H04R 1/10; H04R 1/091; H04R 1/023; H04R 1/1086; H04R 1/2823; H04R 1/2826; H04R 1/2846; H04R 1/2849; H04R 1/2876; H04R 1/288; D04B 21/06; D04B 21/08; D04B 21/14; D10B 2503/00
See application file for complete search history.

(56) References Cited

U.S. PATENT DOCUMENTS

| | | | | |
|---|---|---|---|---|
| 5,339,657 A * | 8/1994 | McMurray | D04B 21/10 66/195 |
| 7,549,303 B2 | 6/2009 | Callaway et al. | |
| 9,588,551 B1 | 3/2017 | Hegde et al. | |
| 9,894,789 B1 | 2/2018 | Hamada et al. | |
| 10,156,029 B1 * | 12/2018 | Podhajny | A41D 31/02 |

(Continued)

OTHER PUBLICATIONS

Leong, Lewis, Bose QuietComfort 35 II review Smart noise-cancelling headphones for voice assistant diehards, TechRadar, Nov. 20, 2019, pp. 1-14, Future US, Inc., New York, United States.

*Primary Examiner* — Thang V Tran
(74) *Attorney, Agent, or Firm* — Treyz Law Group, P.C.; Kendall P. Woodruff

(57) ABSTRACT

A pair of headphones may include first and second ear cups that each contain one or more speakers. The speakers may emit audio through a sound-permeable warp knit spacer fabric that is coupled to each ear cup. The warp knit spacer fabric may include inner and outer fabric layers joined by a spacer layer. The outer fabric layer may have first and second regions with different fabric densities. The first region with the greater fabric density may be used to form a label such as an R-shape or L-shape to indicate which ear cup should cover the user's right ear and which ear cup should cover the user's left ear. The denser first region may have diamond-shaped openings of a first size and the less dense second region may have diamond-shaped openings of a second size that is greater than the first size.

17 Claims, 8 Drawing Sheets

(56) References Cited

U.S. PATENT DOCUMENTS

| | | | | |
|---|---|---|---|---|
| 10,427,374 | B2 | 10/2019 | Hamada et al. | |
| 2005/0112975 | A1 | 5/2005 | McMurray | |
| 2016/0032502 | A1* | 2/2016 | Beyer | D03D 9/00 66/96 R |
| 2018/0195218 | A1* | 7/2018 | Hamada | D04B 27/32 |
| 2018/0272644 | A1* | 9/2018 | Hamada | B32B 7/03 |
| 2019/0238968 | A1* | 8/2019 | Hajati | H04R 5/033 |
| 2020/0208311 | A1* | 7/2020 | Bowles | D04B 1/18 |
| 2021/0112326 | A1* | 4/2021 | Bogan | H04R 1/1008 |

* cited by examiner

ELECTRONIC DEVICES WITH SOUND PERMEABLE FABRIC

This application claims the benefit of provisional patent application No. 63/002,233, filed Mar. 30, 2020, which is hereby incorporated by reference herein in its entirety.

FIELD

This relates generally to fabric and, more particularly, to systems for forming warp knit fabric and devices that include warp knit fabric.

BACKGROUND

It may be desirable to form headphones, voice-controlled assistant devices, bags, covers for electronic devices such as cellular telephones and tablet computers, and other equipment from fabric. Fabric-based items such as these may have an attractive appearance and may benefit from desirable attributes associated with fabric such as sound permeability, light weight, and durability.

In some arrangements, knit fabric may have an appearance and other attributes that are preferred over woven fabric. It may be easier and faster to produce warp knit fabric than weft knit fabric, so applications involving knit fabric often rely on warp knit fabric.

It can be challenging, however, to produce warp knit fabric with desired characteristics.

SUMMARY

A pair of headphones may include first and second ear cups that each contain one or more speakers. The speakers may emit audio through a sound-permeable warp knit spacer fabric that is coupled to each ear cup. The sound-permeable warp knit spacer fabric may include left and right ear cup labels that are formed from dense fabric regions that are visibly distinguishable from surrounding less dense fabric regions while still maintaining the desired level of sound permeability in the warp knit spacer fabric.

The warp knit spacer fabric may include inner and outer fabric layers joined by a spacer layer. The outer fabric layer may have a first region with a first fabric density and a second region with a second fabric density that is less than the first fabric density. The first region with the greater fabric density may be used to form a label such as an R-shape or L-shape to indicate which ear cup should cover the user's right ear and which ear cup should cover the user's left ear. The denser first region may have diamond-shaped openings of a first size and the less dense second region may have diamond-shaped openings of a second size that is greater than the first size.

The inner and outer fabric layers of the warp knit spacer fabric may include strands that form interconnected loops. Each of the diamond-shaped openings may have four sides. In the denser fabric region that forms the label, each of the four sides of the smaller diamond-shaped openings may include fewer loops than each of the four sides of the larger diamond-shaped openings in the less dense region. For example, each of the four sides of the smaller openings may be formed from a single loop, whereas each of the four sides of the larger openings may be formed from three loops.

The inner fabric layer may be interposed between the speaker and the outer fabric layer and may include a uniform density throughout or may include a denser region at the edges to provide more surface area for bonding the inner fabric layer to surrounding housing structures. The remaining portions of the inner fabric layer may include triangular openings, diamond-shaped openings, or openings of other shapes.

DETAILED DESCRIPTION

Figure 1:
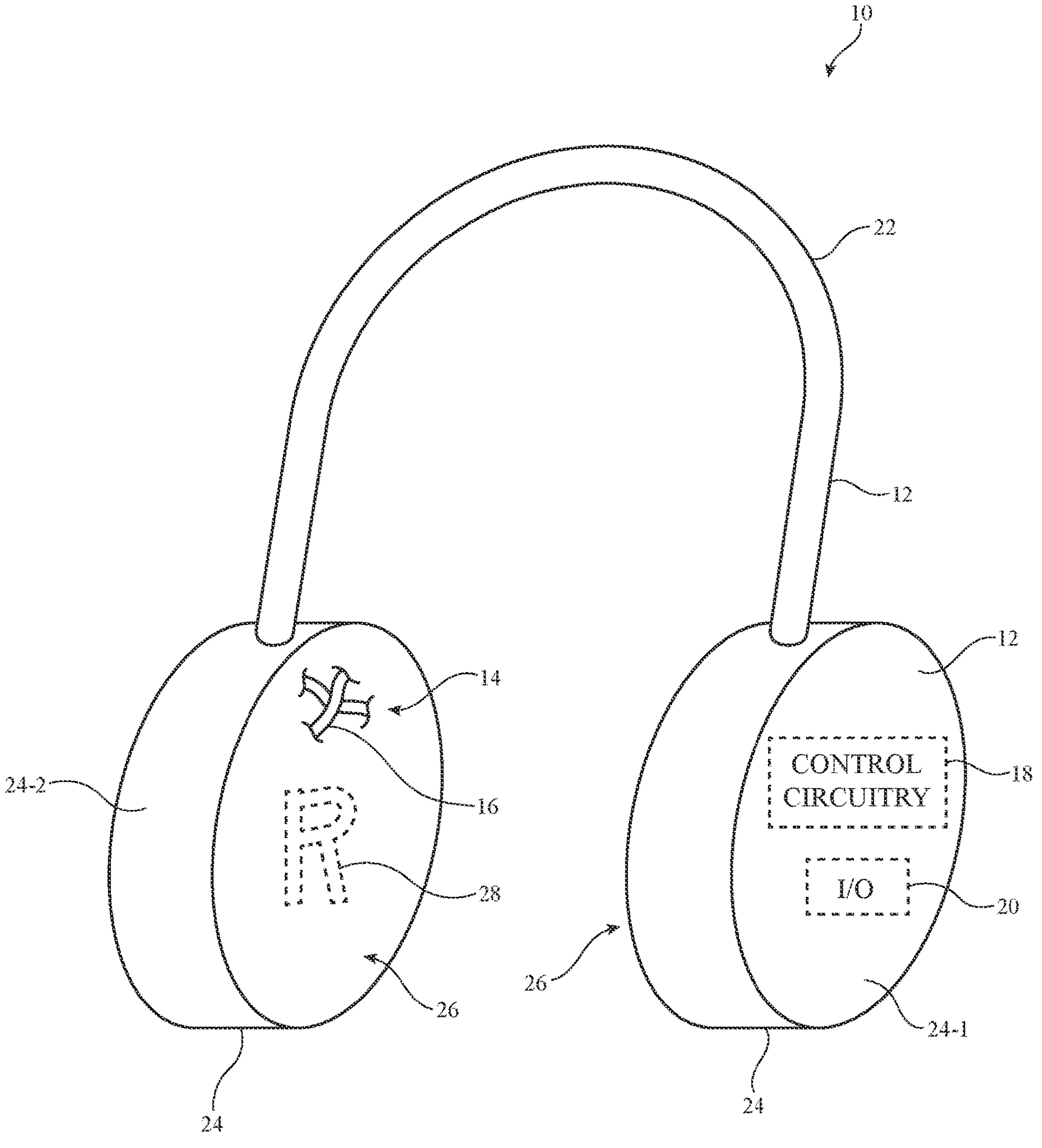
FIG. 1 is a perspective view of an illustrative fabric-based item such as a pair of headphones with one or more fabric portions in accordance with an embodiment.

Items such as item 10 of FIG. 1 may be based on fabric. Item 10 may be an electronic device or an accessory for an electronic device such as a pair of headphones, a voice-controlled electronic device (sometimes referred to as a digital assistant or voice-controlled speaker), a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable fabric-based item. In the illustrative configuration of FIG. 1, item 10 is a pair of headphones. Other types of device may incorporate fabric, if desired.

As shown in FIG. 1, item 10 may include a housing such as housing 12. Housing 12 may include ear cups such as ear cups 24. There may be two ear cups 24 in device 10 that are coupled by a support such as band 22. Band 22 may be flexible and may have a curved shape to accommodate a user's head. There may be left and right ear cups 24 in device 10, such as ear cup 24-1 for one of the user's ears and ear cup 24-2 for the other one of the user's ears. Each ear cup 24 may have an area such as sound-permeable region 26 through which sound may be emitted from a speaker (e.g., a speaker system with one or more drivers).

Housing 12 may have the shape of a pair of headphones of the type shown in FIG. 1, may have the shape of a voice-controlled speaker (e.g., a cylindrical shape, a pyramidal shape, a conical shape, a box shape such as a rectangular box shape, a spherical shape, etc.), or may have other suitable shape. Housing 12 may include support structures formed from metal, polymer, ceramic, glass, wood, other materials, and/or combinations of these materials. Device 10 may include fabric 14. Fabric 14 may form all or part of a housing wall or other layer in an electronic device, may form internal structures in an electronic device, or may form other fabric-based structures. Fabric 14 may be soft (e.g., device 10 may have a fabric surface that yields to a light touch), may have a rigid feel (e.g., may be a stiff fabric), may be coarse, may be smooth, may have ribs or other patterned textures, and/or may be formed as part of a device that has portions formed from non-fabric structures of plastic, metal, glass, crystalline materials, ceramics, or other materials. For example, some or all of band 22, ear cups 24, and/or other portions of housing 12 may include and/or may be covered with fabric 14. In some configurations, fabric 14 may serve as a sound-permeable speaker cover in regions 26 of ear cups 24.

Fabric 14 may include interlaced strands of material such as strands 16. Fabric 14 may, for example, be warp knit fabric that is formed by warp knitting strands 16. Strands 16 may be single-filament strands (sometimes referred to as fibers or monofilaments) or may be strands of material formed by intertwining multiple monofilaments of material together (sometimes referred to as yarns).

Strands 16 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands may be formed from bare metal wires or metal wire intertwined with insulating monofilaments (as examples). Bare metal strands and strands of polymer covered with conductive coatings may be provided with insulating polymer jackets.

Items such as item 10 may, if desired, include control circuitry 18. Control circuitry 18 may include microprocessors, microcontrollers, application-specific integrated-circuits, digital signal processors, baseband processors, and/or other controllers and may include storage such as random-access memory, read-only memory, solid state drives, and/or other storage and processing circuitry.

Control circuitry 18 may gather information from sensors and other circuitry in input-output devices 20 and may use input-output devices 20 to supply output. Input-output devices 20 may, for example, include audio devices such as microphones and speakers. Microphones can gather audio input (e.g., sound that passes through fabric 14). Speakers can produce audio output (e.g., sound that passes through fabric 14). Sensors in input-output devices 20 may include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), and/or other sensors. Light-emitting diodes, displays, and other visual output devices may be used in supplying visual output to a user. Buttons, joysticks, haptic output components, and/or other input-output components may be provided in input-output devices 20 to gather input from a user and to provide a user with output. Wireless circuitry in circuitry 18 (e.g., wireless local area network circuitry, cellular telephone circuitry, etc.) may be used to support wireless communications with external equipment.

Integrated circuits and other electrical components forming circuitry 18 and/or input-output devices 20 may be mounted in housing 12. Fabric 14 may cover the exterior of housing 12 (e.g., to hide electrical components in housing 12 from view). Fabric 14 may also be used in forming structural portions of housing 12 and/or other portions of item 10, may be used in forming straps, covers, wearable items, and/or other structures for items 10.

The speakers in ear cups 24 may provide audio to the user's left and right ears. When worn in an unreversed configuration, the right ear cup of device 10 will supply audio to the right ear of the user and the left ear cup of device 10 will supply audio to the left ear of the user. In a reversed configuration, the right ear cup is adjacent to the user's left ear and the left ear cup is adjacent to the user's right ear. For correct audio playback, the assignment of the left and right channels of audio that are being played back to the user can be reversed (so that the left channel of audio is played through the right ear cup and vice versa) whenever device 10 is being worn in the reversed configuration. Unreversed right-left channel assignments may be used when device 10 is being worn in the unreversed configuration.

If desired, fabric 14 of item 10 may include one or more labels such as label 28 in regions 26 of ear cups 24. For example, fabric 14 may have an "L" label in sound-permeable region 26 of ear cup 24-1 to indicate that ear cup 24-1 should cover a user's left ear. Fabric 14 may have an "R" label in sound-permeable region 26 of ear cup 24-2 to indicate that ear cup 24-2 should cover a user's right ear. If desired, other labels, letters, indicators, alphanumeric symbols, logos, patterns, shapes, and/or other designs may be incorporated into fabric 14 (e.g., in sound-permeable region 26 of fabric 14). Arrangements in which sound-permeable fabric labels are formed over input-output components may also be used (e.g., plus and minus signs may be used to label volume increase and volume decrease buttons or touch sensors, etc.). Arrangements in which labels 28 form left and right ear cup labels may sometimes be described herein as an illustrative example.

Labels 28 may be formed from portions of fabric 14. To differentiate labels 28 from the surrounding portions of fabric 14, labels 28 may be formed with strands 16 that are more densely packed together than the surrounding strands 16 of fabric 14. These denser fabric regions may be visually distinguishable from the surrounding less dense fabric regions. The border between the denser fabric regions and less dense fabric regions may form the shape of a letter, such as an R-shape or an L-shape. The dense fabric regions may form only the outline of a letter (e.g., the less dense regions of the fabric may fill the area inside of the outline formed by the dense fabric regions), or the dense fabric regions may fill the entire area between the borders of the letter. This is merely illustrative, however. If desired, other combinations of dense and less dense fabric regions may be used to create the desired shape and design in fabric 14.

The density of fabric 14 may be adjusted across different portions of fabric 14 by changing an amount of space between adjacent strands 16 in fabric 14. In denser fabric regions, the gap between adjacent strands16 may be smaller than the gap between adjacent strands 16 in less dense fabric regions. Care must be taken, however, to ensure that the denser regions of fabric 14 do not negatively impact the sound permeability of fabric 14. To maintain the desired level of sound permeability in fabric 14, the relative density of label-forming regions (e.g., regions of fabric 14 that form the border of label 28 and/or that fill label 28) and non-label-forming regions (e.g., regions of fabric 14 that surround label 28) may be balanced so that labels 28 are visually distinguishable without sacrificing audio quality.

In one illustrative arrangement, which may sometimes be described herein as an example, fabric 14 is formed from a warp knit spacer fabric having first and second warp knit layers joined by a soft, cushiony spacer layer. The first warp knit layer may form an exterior layer of fabric 14 that faces the user's ear, whereas the second warp knit layer may form an interior layer of fabric 14 that faces the speaker in earcup 24. Label 28 may be formed in the exterior layer of fabric 14 that faces the user's ear. Both the interior and exterior layers of fabric 14 may have openings. The openings may have different sizes, shapes, and/or other characteristics. In one illustrative arrangement, the exterior fabric layer may include openings of a first size in the dense fabric regions that form labels 28 and may include openings of a second size that is larger than the first size in the less dense fabric regions that surround labels 28. The interior layer of fabric may have openings of a third size that is larger than the first size but smaller than the second size, thereby boosting the visibility of label 28 and hiding internal components from view without compromising sound quality. If desired, edge regions of the interior fabric layer and/or the exterior fabric layer may have be formed with denser fabric portions to provide more surface area that facilitates mechanical coupling between fabric 14 and the surrounding portions of housing 12.

Figure 2:
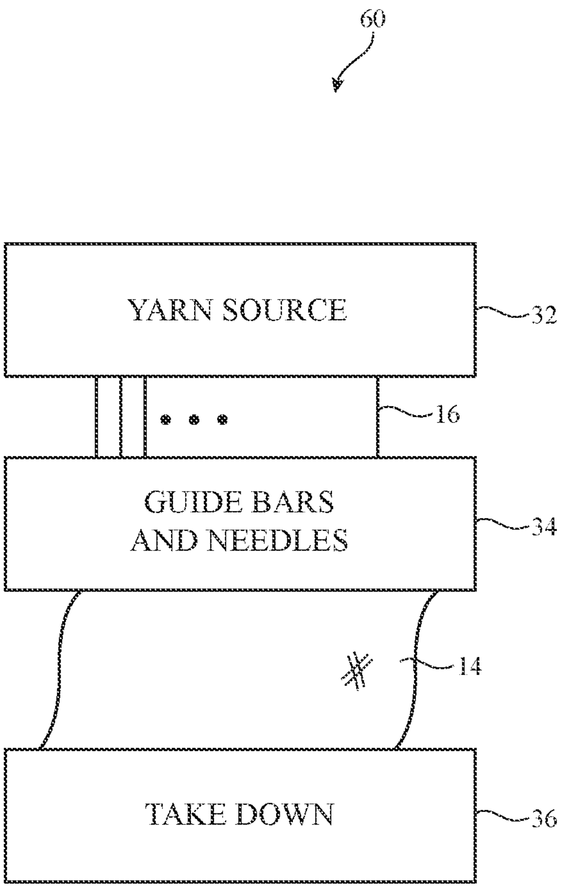
FIG. 2 is a schematic diagram of an illustrative warp knitting system in accordance with an embodiment.

A warp knitting machine or other equipment may be used in forming fabric 14 from strands 16. FIG. 2 is a schematic diagram of an illustrative warp knitting system. As shown in FIG. 2, yarn source 32 in warp knitting system 60 may be used in supplying strands 16 to guide and needle structures 34. Structures 34 may include strand guide structures (e.g., a system of movable guide bars with eyelets that guide strands 16) and needle systems (e.g., needle guide systems that guide sets of individually adjustable needles so that the needles may interact with the strands dispensed by the guide bars). During operations, a controller may control electrically adjustable positioners in system 60 to manipulate the positions of guide bars and needles in system 60 and thereby knit strands 16 into fabric 14. Take down 36 (e.g., a pair of mating rollers or other equipment forming a take down system) may be used to gather fabric 14 that is produced during knitting.

The positioners in system 60 for positioning needles and guide bars may be controlled dynamically by a controller. If desired, each needle in system 60 may have a respective individually adjustable positioner to provide system 60 with Jacquard capabilities, and/or sets of two or more needles may be adjusted together (e.g., to reduce the number of individually adjustable positioners that are used). The ability of each positioner to be independently controlled by a controller allows each needle to be moved independently, thereby allowing fabrics with a variety of different designs to be formed.

Figure 3:
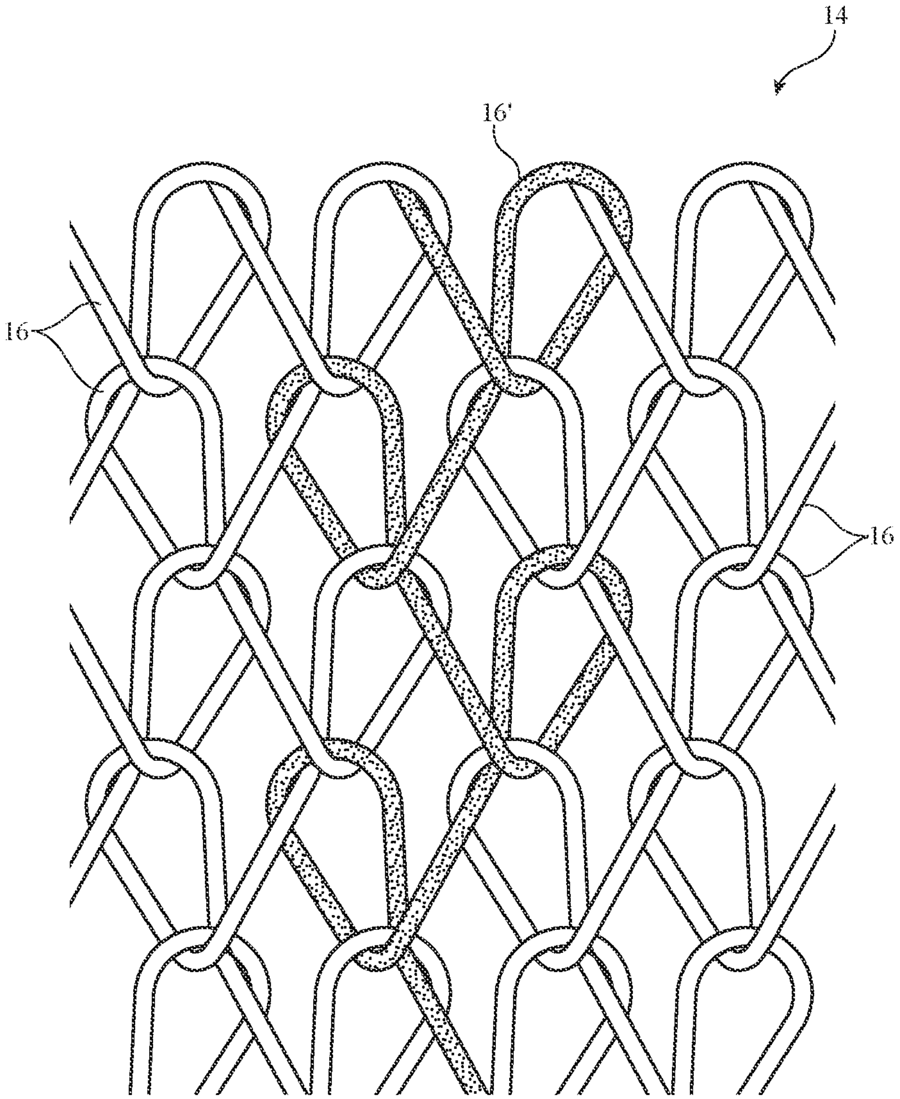
FIG. 3 is a diagram of a portion of an illustrative layer of warp knit fabric in accordance with an embodiment.

A layer of illustrative warp knit fabric 14 is shown in FIG. 3. An illustrative strand 16' among strands 16 has been highlighted to show the zig-zag path taken by each strand in fabric 14.

During knitting, control circuitry in system 60 may direct electrically adjustable positioners in system 60 to knit fabric 14 with any suitable warp knit pattern. As an example, control circuitry in system 60 may use the electrically adjustable positioners to knit fabric 14 that includes diamond-shaped openings or openings of other suitable shapes, as illustrated by openings 38 in warp knit fabric 14 of FIG. 4. The size or area of openings 38 may be dynamically adjusted as desired to create denser fabric regions for forming labels 28 of FIG. 1 and/or for forming less dense fabric regions in the areas of fabric 14 that do not form labels 28.

Figure 5:
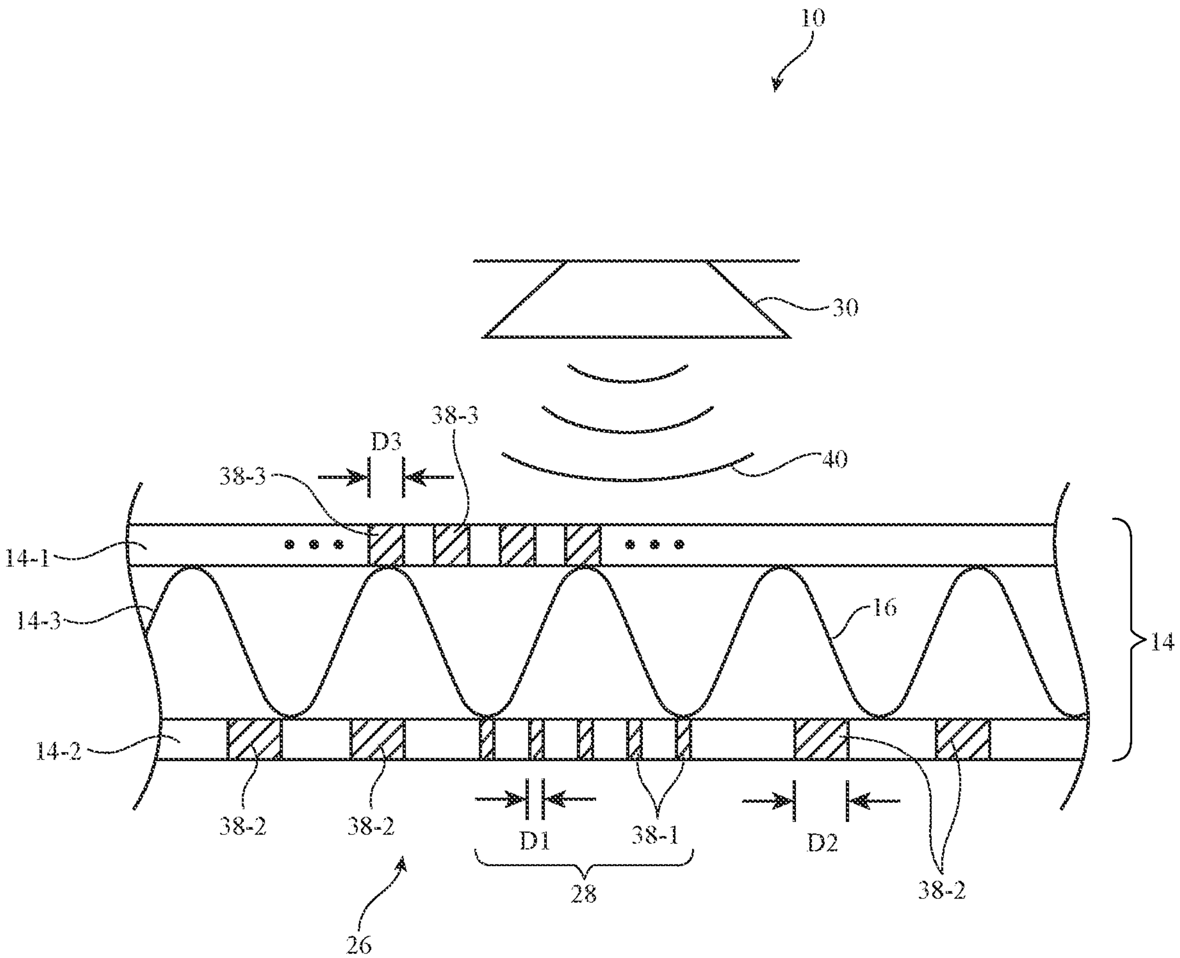
FIG. 5 is a cross-sectional side view of an illustrative fabric-based item having a sound-permeable spacer fabric with openings of different sizes to form one or more labels in accordance with an embodiment.

FIG. 5 is a cross-sectional side view of a portion of item 10 showing how fabric 14 may be a warp knit spacer fabric that overlaps speaker 30 (e.g., a speaker in a respective ear cup 24 of FIG. 1). As shown in FIG. 5, fabric 14 may include first and second fabric layers such as interior fabric layer 14-1 and exterior fabric layer 14-2. Fabric layers 14-1 and 14-2 may be joined by spacer layer 14-3. Strands 16 of spacer layer 14-3 may be formed from monofilaments (e.g., polymer monofilament fibers) and/or other strands of material. Each strand 16 of spacer layer 14-3 may be coupled alternately to one or more inner fabric layers such as inner fabric layer 14-1 and one or more outer fabric layers such as outer fabric layer 14-2.

Inner fabric layer 14-1 may be formed using a first set of needles (sometimes referred to as a needle bed) in system 60 of FIG. 2, and outer fabric layer 14-2 may be formed using a second set of needles in system 60 of FIG. 2. By dynamically controlling the needles that knit fabric layer 14-1 and the needles that knit fabric layer 14-2, openings 38 with different sizes and/or different shapes may be formed in different portions of fabric layer 14-1 and 14-2. The different sizes of openings may be used to create a label in fabric 14 without compromising the sound permeability of fabric 14 in region 26.

For example, to create a denser fabric region having the shape of label 28, outer fabric layer 14-2 may include openings 38-1 having size D1. The less dense regions of outer fabric layer 14-2 may include openings 38-2 having size D2. The size D2 of openings 38-2 may be greater than the size D1 of openings 38-1. Due to the smaller size of openings 38-1 in the region of label 28, label 28 may be visually distinguished from the surrounding portions of fabric layer 14-2 with larger openings 38-2. The larger size of openings 38-2 may help maintain the desired level of sound permeability of fabric 14 despite the presence of denser fabric in the region of label 28.

Inner fabric layer 14-1 may have openings 38-3 with a third size D3. In one illustrative arrangement, size D3 may be greater than size D1 but less than size D2. The smaller size of openings 38-3 compared to openings 38-2 may allow inner fabric layer 14-1 to hide internal components from view (e.g., components inside of ear cup 24 such as speaker 30), while the larger size of openings 38-3 compared to openings 38-1 may help maintain the desired level of sound permeability of fabric 14. This is, however, merely illustrative. If desired, size D3 of openings 38-3 may be equal to size D1 or D2, may be greater than size D1 or D2, or may be less than size D1 or D2.

Figure 4:
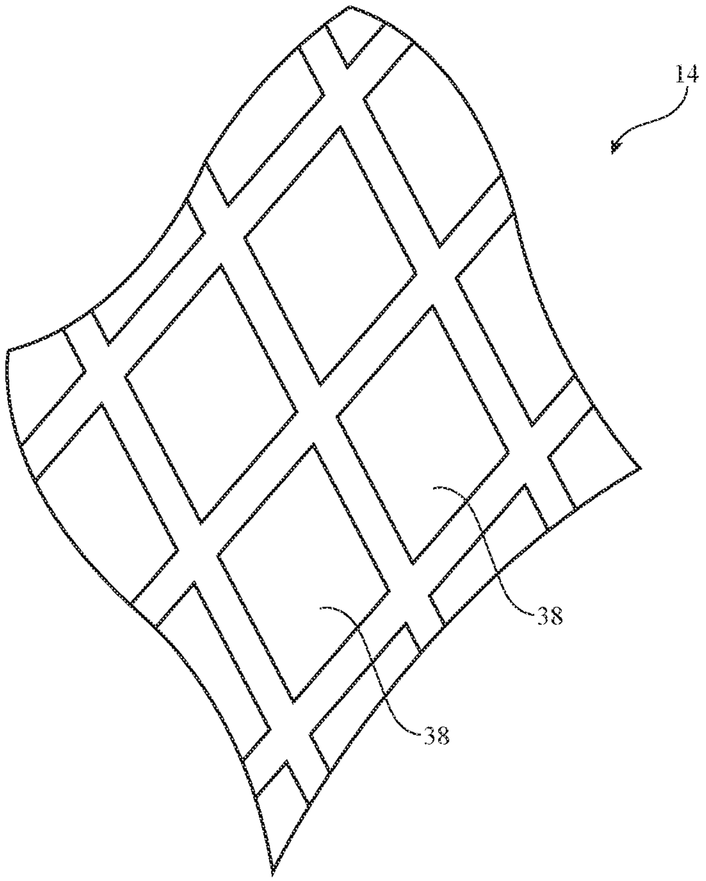
FIG. 4 shows how a layer of fabric may have openings such as diamond-shaped openings in accordance with an embodiment.

Openings 38-1, 38-2, and 38-3 may be diamond-shaped openings (e.g., as shown in FIG. 4), may be triangle-shaped openings, and/or may have any other suitable shape. If desired, openings 38-1, 38-2, and 38-3 may have different shapes or may all have the same shape. For example, openings 38-1 and 38-2 are diamond-shaped openings and openings 38-3 are triangle-shaped openings. This is, however, merely illustrative. Other shapes or combinations of shapes may be used, if desired. In some arrangements, fabric layer 14-1 and/or fabric layer 14-2 may include openings of sizes that are different from D1, D2, and D3. For example, the presence of smaller openings 38-1 may cause some of openings 38-2 around the edges of label 28 to expand relative to the rest of openings 38-2, creating openings that are bigger than size D3 around the border of label 28. This is, however, merely illustrative. If desired, openings 38-2 may all have the same size.

Figure 6:
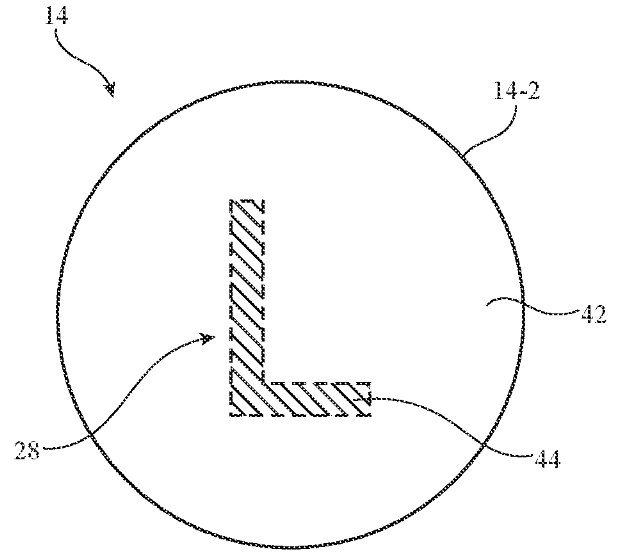
FIGS. 6 and 7 are front views of illustrative sound-permeable fabric layers having regions with openings of different sizes to form one or more labels in accordance with an embodiment.

FIG. 6 is a front view of outer fabric layer 14-2 of fabric 14 showing an illustrative arrangement for label 28. As shown in FIG. 6, outer fabric layer 14-2 may have fabric regions 42 and 44. Fabric region 42 may be formed from strands 16 that are less densely packed together than strands 16 that make up region 44. For example, dense fabric region 44 may have openings 38-1 of size D1 of FIG. 5, whereas less dense region 42 may have openings 38-2 of size D2 of FIG. 5. Due to the different sizes of openings in regions 42 and 44, a visually distinguishable border between regions 42 and 44 may be present in fabric layer 14-2. This border may have the shape of the desired label 28. In the example of FIG. 6, label 28 has an L-shape to indicate that the ear cup 24-1 (FIG. 1) is intended to cover the user's left ear. The other ear cup 24-2 in device 10 may have a similar fabric layer 14-2 with denser fabric region 44 instead forming an R-shaped label 28 to indicate that the ear cup 24-2 is intended to cover the user's right ear. Other labels or shapes may be formed using combinations of denser fabric regions 44 and less dense fabric regions 42, if desired.

In the example of FIG. 6, the entire shape of label 28 is made up of denser fabric region 44. In other words, the outline of label 28 is filled entirely by denser fabric region 44. This is merely illustrative, however. If desired, label 28 may be formed from an outline of the desired shape that is not filled entirely with denser fabric. This type of arrangement is shown in FIG. 7.

Figure 7:
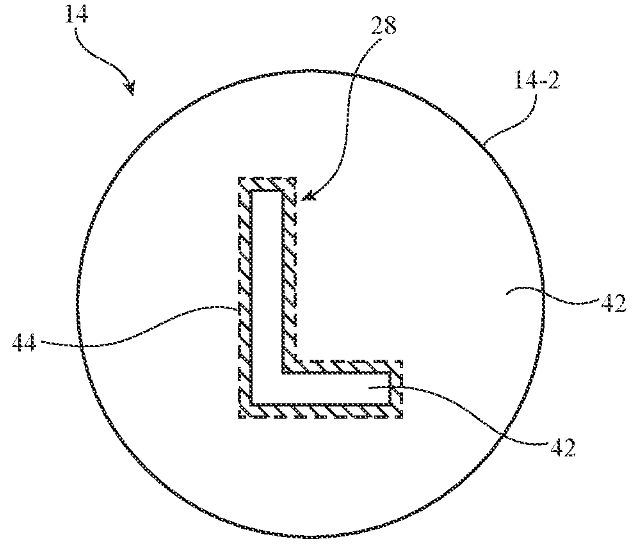

As shown in FIG. 7, denser fabric region 44 may form an outline of the desired label 28. For example, denser fabric region 44 may form an L-shaped outline or may form an outline of any other suitable shape. Inside of the outline formed by denser fabric region 44, fabric layer 14-2 may have less dense fabric region 42. Less dense fabric region 42 may also make up the area of fabric layer 14-2 outside of label 28.

Figure 8:
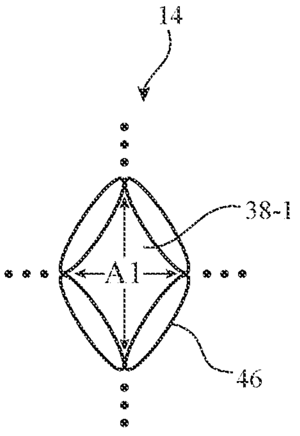
FIG. 8 is a front view of a portion of an illustrative sound-permeable fabric having diamond-shaped openings of a first size in accordance with an embodiment.

FIG. 8 is a front view of a portion of illustrative fabric having openings that may be used in the denser portions of fabric 14 such as label-forming regions 44 of FIGS. 6 and 7. As shown in FIG. 8, openings 38-1 may be diamond-shaped openings and may be formed from knit loops of fabric 14 such as loops 46. To create openings 38-1 with smaller area A1 (e.g., an area corresponding to size D1 of FIG. 5), each side of opening 38-1 may be made up of a fewer number of loops than larger openings such as openings 38-2. In the example of FIG. 8, each side of diamond-shaped opening 38-1 is made up of one loop 46. This type of fabric construction may sometimes be referred to as a one-by-one diamond pattern because each side of the diamond is made up of one loop 46. The use of one loop 46 to form each side of opening 38-1 is merely illustrative, however. If desired, fabric 14 may have a two-by-two pattern in which each side of opening 38-1 is made up of two loops 46, may have a three-by-three pattern in which each side of opening 38-1 is made up of three loops 46, and/or may have any other suitable number of loops (e.g., a number less than the number of loops that make up the sides of openings 38-2).

Figure 9:
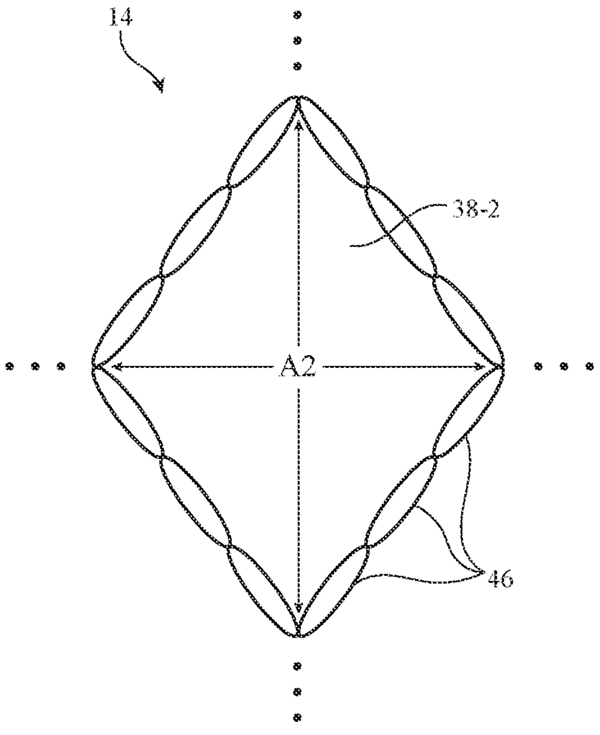
FIG. 9 is a front view of a portion of an illustrative sound-permeable fabric having diamond-shaped openings of a second size in accordance with an embodiment.

FIG. 9 is a front view of a portion of illustrative fabric having openings that may be used in the less dense portions of fabric 14 such as regions 42 of FIGS. 6 and 7. As shown in FIG. 8, openings 38-2 may be diamond-shaped openings and may be formed from knit loops of fabric 14 such as loops 46. To create openings 38-2 with larger area A2 (e.g., an area larger than area A1 and corresponding to size D2 of FIG. 5), each side of opening 38-2 may be made up of a greater number of loops than smaller openings such as openings 38-1. In the example of FIG. 9, each side of diamond-shaped opening 38-2 is made up of three loops 46. This type of fabric construction may sometimes be referred to as a three-by-three diamond pattern because each side of the diamond is made up of three loops 46. The use of three loops 46 to form each side of opening 38-2 is merely illustrative, however. If desired, fabric 14 may have a two-by-two pattern in which each side of opening 38-2 is made up of two loops 46, may have a four-by-four pattern in which each side of opening 38-2 is made up of four loops 46, and/or may have any other suitable number of loops (e.g., a number greater than the number of loops that make up each side of openings 38-1).

Figure 10:
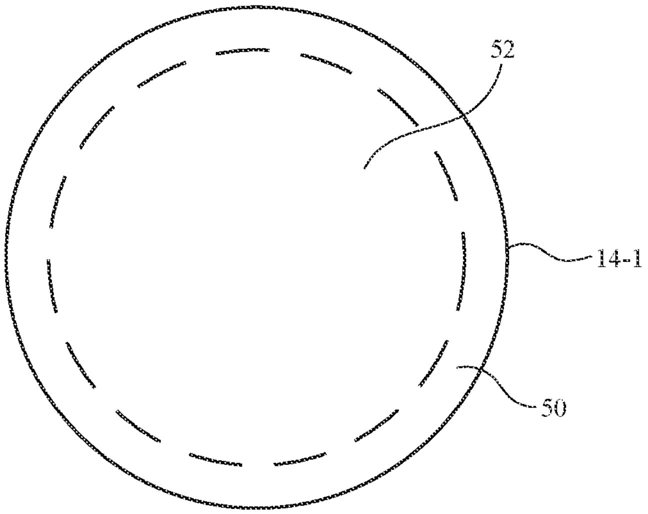
FIG. 10 is a front view of an illustrative sound-permeable fabric layer having regions with openings of different sizes to form a backing region and an attachment region in accordance with an embodiment.

FIG. 10 is a front view of inner fabric layer 14-1 of fabric 14. As shown in FIG. 10, inner fabric layer 14-1 may have fabric regions 52 and 50. Fabric region 52 may be formed from strands 16 that are less densely packed together than strands 16 that make up region 50. The presence of denser fabric regions 50 may help create more surface area for bonding fabric layer 14-1 to surrounding housing structures (e.g., region 50 may be a bonding region where fabric 14-1 is adhesively bonded or otherwise attached to housing 12 of FIG. 1). If desired, denser fabric region 50 may have a one-by-diamond pattern similar to openings 38-1 of FIG. 8. Less dense fabric region 52 may make up the remaining portion of fabric layer 14-2 and may have openings that are larger than the openings in region 50. The size of the openings in region 52 may be greater than the size of openings 38-1 but less than the size of openings 38-2, which in turn may help inner fabric layer 14-1 hide internal components (e.g., within ear cup 24) from view while still maintaining the desired level of sound permeability. This is merely illustrative, however. If desired, openings in region 52 may be bigger than openings 38-1 and 38-2 or may be smaller than openings 38-1 and 38-2.

Figure 11:
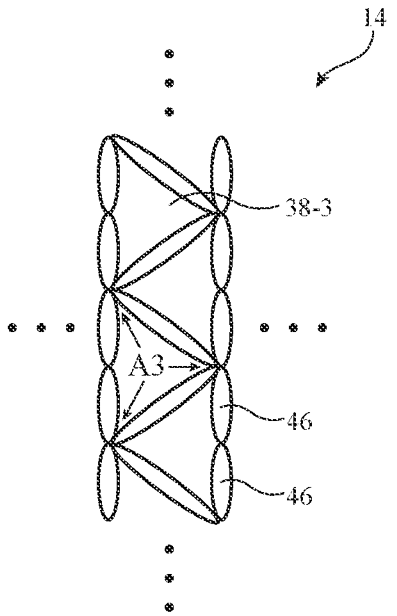
FIG. 11 is a front view of a portion of an illustrative sound-permeable fabric layer having triangular openings with a third size in accordance with an embodiment.

FIG. 11 is a front view of a portion of illustrative fabric having openings that may be used in the less dense portions of inner fabric layer 14-1 such as region 52 of FIG. 10. As shown in FIG. 11, openings 38-3 may be triangle-shaped openings and may be formed from knit loops of fabric 14 such as loops 46. To create triangular openings 38-3 with area A3 (e.g., an area corresponding to size D3 of FIG. 5), fabric 14 may have a ladder pattern in which loops 46 are arranged in vertical columns to create a ladder-like shape.

Each pair of vertical columns is joined together by a series of diagonal bridges formed by additional loops 46. In the example of FIG. 11, each diagonal bridge between an adjacent pair of vertical columns is made up of a single loop 46. This type of fabric construction may sometimes be referred to as a one-by-one ladder pattern. The use of one loop 46 to form each diagonal bridge between adjacent columns of loops 46 is merely illustrative, however. If desired, fabric 14 may have a two-by-two ladder pattern in which each diagonal bridge between adjacent vertical columns is made up of two loops 46, may have a three-by-three ladder pattern in which each diagonal bridge between adjacent vertical columns is made up of three loops 46, and/or may have any other suitable pattern. Arrangements in which openings 38-3 have a diamond pattern (e.g., a one-by-one diamond pattern of the type shown in FIG. 8, a three-by-three diamond pattern of the type shown in FIG. 9, a two-by-two diamond pattern, and/or other suitable diamond pattern) may also be used, if desired.

The foregoing is merely illustrative and various modifications can be made to the described embodiments. The foregoing embodiments may be implemented individually or in any combination.

What is claimed is:

1. An electronic device that provides audio to a user, comprising:

an ear cup containing a speaker; and a warp knit fabric through which the speaker provides the audio to the user, wherein the fabric comprises first openings of a first size and second openings of a second size that is greater than the first size, wherein the first openings form a label for the ear cup, wherein the warp knit fabric comprises a warp knit spacer fabric having inner and outer layers joined by a spacer layer, and wherein the first openings and the second openings are located in the outer layer.

2. The electronic device defined in claim 1 wherein the first openings comprise first diamond-shaped openings and the second openings comprise second diamond-shape openings.

3. The electronic device defined in claim 2 wherein the warp knit fabric comprises strands that form loops, wherein each of the first diamond-shaped openings and the second diamond-shaped openings has four sides, wherein each of the four sides of the first diamond-shaped openings is made up of a first number of loops, and wherein each of the four sides of the second diamond-shaped openings is made up of a second number of loops that is greater than the first number.

4. The electronic device defined in claim 3 wherein the first number is one and the second number is three.

5. The electronic device defined in claim 1 wherein the label comprises a shape selected from the group consisting of: an L-shape and an R-shape.

6. The electronic device defined in claim 1 wherein the inner layer comprises third openings.

7. The electronic device defined in claim 6 wherein the third openings have a triangular shape.

8. The electronic device defined in claim 6 wherein the third openings have a third size that is greater than the first size and less than the second size.

9. A pair of headphones, comprising:

first and second ear cups that respectively contain first and second speakers; and a first spacer fabric through which the first speaker emits sound and a second spacer fabric through which the second speaker emits sound, wherein each of the first and second spacer fabrics comprises:

an exterior warp knit layer having a first region with a first fabric density and a second region with a second fabric density that is less than the first fabric density, wherein the first region has a letter shape;

an interior warp knit layer; and a spacer layer joining the exterior warp knit layer and the interior warp knit layer.

10. The pair of headphones defined in claim 9 wherein the first region has first openings, the second region has second openings, and wherein the first openings are smaller than the second openings.

11. The pair of headphones defined in claim 10 wherein the interior warp knit layer comprises third openings having a different shape than that of the first and second openings.

12. The pair of headphones defined in claim 9 wherein the interior warp knit layer has a third region with a third fabric density and a fourth region with a fourth fabric density that is greater than the third fabric density.

13. The pair of headphones defined in claim 12 wherein the first and second ear cups are formed from housing structures and wherein the fourth region of the interior warp knit layer forms a bonding region for bonding the interior warp knit layer to the housing structures.

14. An electronic device that provides audio to a user, comprising:

a housing;

a speaker mounted in the housing; and a sound-permeable warp knit fabric that overlaps the speaker, wherein the sound- permeable warp knit fabric comprises strands that occupy first and second regions of the sound- permeable warp knit fabric, wherein the strands are more densely packed in the first region than in the second region, wherein the border between the first and second regions has a shape that forms a label, wherein the sound-permeable warp knit fabric comprises a sound-permeable warp knit spacer fabric having inner and outer fabric layers joined by a spacer layer, wherein the inner fabric layer is interposed between the speaker and the outer fabric layer, and wherein the first and second regions openings are located in the outer fabric layer.

15. The electronic device defined in claim 14 wherein the first region has first diamond-shaped openings and the second region has second diamond-shaped openings that are larger than the first diamond-shaped openings.

16. The electronic device defined in claim 15 wherein the strands form loops and wherein each of the second diamond-shaped openings is bordered by a greater number of the loops than each of the first diamond-shaped openings.

17. The electronic device defined in claim 15 wherein the inner fabric layer has openings that are larger than the first diamond-shaped openings and smaller than the second diamond-shaped openings.

* * * * *